United States Patent [19]

Lindstrom

[11] 4,032,693
[45] June 28, 1977

[54] PROCEDURE TO STABILIZE AN IRON AIR BATTERY

[75] Inventor: Olle Birger Lindstrom, Taby, Sweden

[73] Assignee: AB Olle Lindstrom, Taby, Sweden

[22] Filed: Aug. 27, 1976

[21] Appl. No.: 718,326

[52] U.S. Cl. ............................................ 429/17
[51] Int. Cl.² ..................................... H01M 8/18
[58] Field of Search ................. 429/17, 19, 29, 46

[56] References Cited

UNITED STATES PATENTS

| | | | |
|---|---|---|---|
| 3,649,362 | 3/1972 | Steffenson et al. | 429/29 |
| 3,920,474 | 11/1975 | Zito | 429/17 |
| 3,925,100 | 12/1975 | Buzzelli | 429/29 |

*Primary Examiner*—John H. Mack
*Assistant Examiner*—H. A. Feeley
*Attorney, Agent, or Firm*—Burns, Doane, Swecker & Mathis

[57] ABSTRACT

An iron-air battery cell including positive and negative electrodes and an alkaline electrolyte. The positive electrode contains at least one of the metals cobalt, nickel and silver. The negative electrode contains an electrochemically active iron. The electrolyte contains a sulphur-containing compound in a concentration of at least about 10 ppm and up to about 1,000 ppm counted on the weight of the active iron material.

10 Claims, 2 Drawing Figures

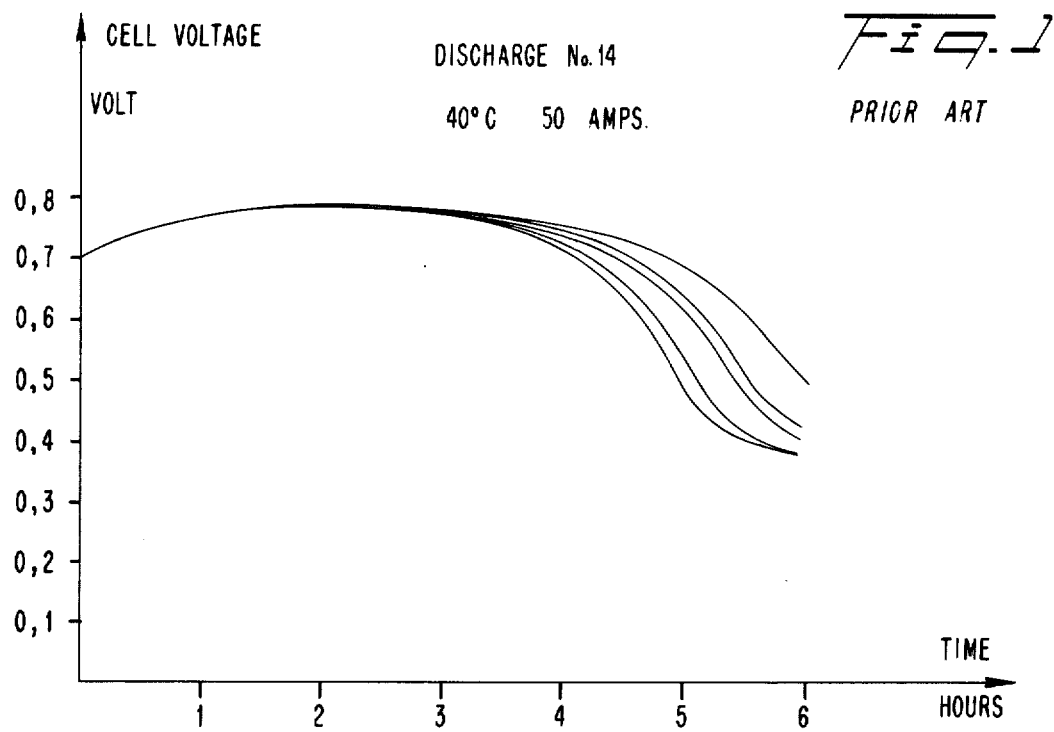
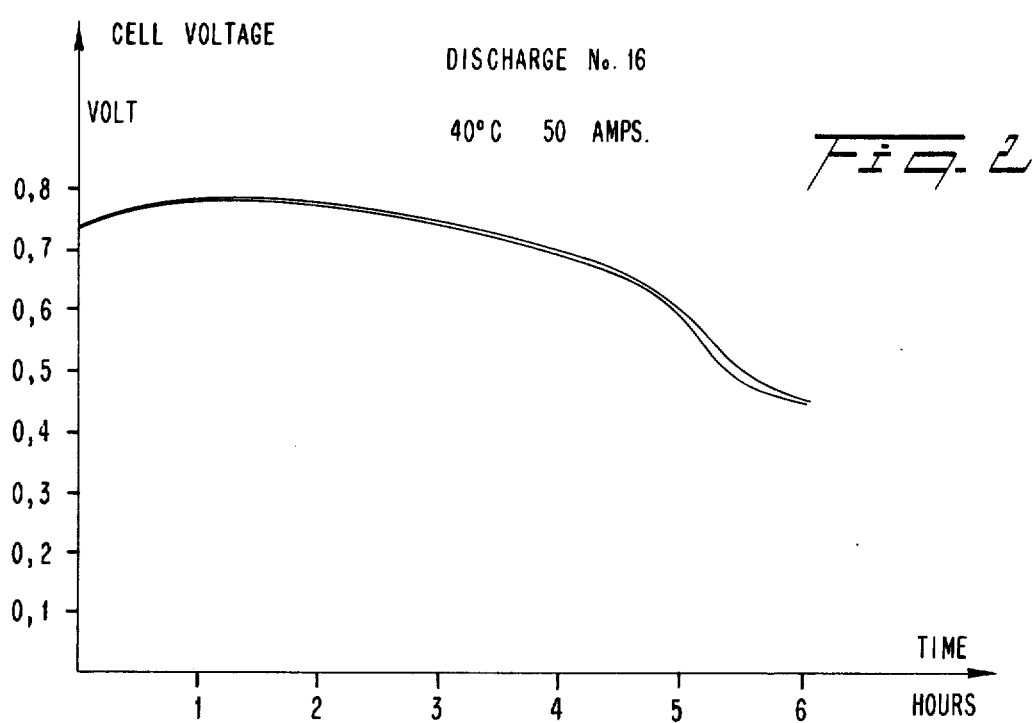

PROCEDURE TO STABILIZE AN IRON AIR BATTERY

BACKGROUND AND OBJECTS

The present invention relates to a procedure for stabilizing an iron-air battery comprising one of several cells with a positive electrode containing at least one of the metals cobalt, nickel and silver for the reduction of the oxygen of the air during discharge and the development of oxygen during charge, an alkaline electrolyte and a negative electrode containing electrochemically active iron, whereby a sulphur-containing compound is added to the electrolyte. The invention also refers to an iron-air battery cell stabilized in this way.

The iron air battery is one of the most promising electrochemical power sources for tractionary application on large scale. The energy density is high, on the order of 100 Wh/kg, and the power density is sufficient for most applications, i.e., on the order of 20–40 W/kg. The iron-air battery also uses cheap electrode materials, which furthermore do not constitute hazards to the environment during the steps of manufacture, use and recovery.

This power source is, however, not completely problem-free. It has certainly been found possible to make iron electrodes with a very high capacity density and good mechanical properties, for instance according to the procedure which is described in the Swedish Pat. No. 360,952. However, even these iron electrodes exhibit, as do other iron electrodes, certain problems which are connected with the electrode material as such, namely a tendency to self-discharge and the occurrence of variations in capacity, depending on the mode of operation and the discharge pattern.

These problems have been known since the pioneering work on alkaline accumulators was carried out by Thomas Alva Edison, and Waldemar Junner. It is known that it is possible to improve the properties of the iron-air electrode by the addition of mercury oxide which was used by Edison and is described for instance in U.S. Pat. No. 692,507, or by the addition of sulphur or sulphur-containing compounds to the electrolyte or to the iron electrode as described for instance in Swedish Pat. No. 196,168 and the German Offenlegungs publication No. 2,164,208. Mercury is, however, a less useful material in this connection because of the high price of the metal and the risk that mercury vapour will be released to the atmosphere through the air electrode which could become a serious hazard to the environment. The use of sulphur or sulphur-containing compounds according to the state of the art has not been able to stabilize the iron electrode in most iron-air batteries.

The use of very high sulphur contents has so far been practiced, i.e., the Swedish Pat. No. 196,168 recommends a sulphide electrolyte containing 38 grams $Na_2S.9H_2O$ in 200 ml of electrolyte, which means that the sulphur contained in this electrolyte will be about 20.000 ppm (parts per million) of the weight of the electrolyte. The use of such high sulphur contents in an attempt to stabilize iron-air batteries having iron anodes and cathodes containing some of the metals nickel, cobalt and silver as supporting and catalytically active components in the electrode has the result has been that these cells become inactivated very rapidly because the function of the cathode becomes eliminated.

Air cathodes of this type contain small quantities of oxides and hydroxides of the mentioned metals which produce an electrocatalytical action in the electron charge transfer step and a catalytic action on the decomposition of peroxide produced in the cathode reaction. These active metal compounds apparently react with the sulphide additive forming inactive compounds when sulphide is added to the electrolyte according to this procedure of the state of the art. This is a very difficult problem since iron-air batteries according to the state of art, which can reduce the oxygen of the air during discharge and develop oxygen during charge, generally contain one or several of the metals mentioned above. Such an air cathode is described in Swedish Pat. No. 360,952 for example.

It is, therefore, an object of the present invention to provide a method of stabilizing an iron-air battery.

It is another object of the invention to provide a stabilized iron-air battery.

BRIEF DESCRIPTION

The present invention solves the problem described above in an extremely simple way. It is a matter of a new surprising effect caused by very simple means. The technical effect has not been entirely discerned, but a tentative explanation will be offered in the following.

It has been found according to the invention that addition to the electrolyte of a sulphur-containing compound (which forms free sulphide ions in the electrolyte at least temporarily) in a concentration of at least about 10 ppm and up to about 1,000 ppm, counted as weight of sulphur per weight active iron material, stabilizes and improves the performance of the iron-air cells to a considerable degree.

THE DRAWING

A preferred embodiment of the present invention is explained below in accordance with the accompanying drawings in which:

FIG. 1 is a graphical depiction of a discharge curve of an iron-air battery having five cells, without the employment of an electrolyte according to the present invention; and FIG. 2 is a graphical depiction of a discharge curve of the same iron-air battery exhibiting the discharge curve of FIG. 1, with the employment of an electrolyte according to the present invention.

DETAILED DESCRIPTION

At least some of these objects are achieved by the present invention which involves an iron-air battery. The battery comprises one or more cells, each including positive and negative electrodes in contact with an alkaline electrolyte. The positive electrode contains at least one of these metals: cobalt, nickel and silver, mainly to reduce oxygen during discharge and to develop oxygen during charge. The negative electrode contains electrochemically active iron.

In accordance with the invention, there is added to the electrolyte a sulphur-containing compound in a concentration of at least about 10 ppm and up to about 1,000 ppm, counted as weight of sulphur per weight of active iron material in the negative electrode (e.g., 10 parts sulphur per million parts iron).

Contrary to what might be expected, there will be no deactivation of the air cathodes. Rather, the air cathodes even seem to be stabilized and perform a longer life. Furthermore, this extremely small addition, compared to the large addition of the state of the art also produces a stabilizing effect on the iron electrode which could not be expected by the expert in this field. This double action of a very small sulphide addition to the electrolyte must depend on a cooperation between the active materials in the iron electrode and the air cathode containing at least some of the metals iron, nickel, cobalt, and silver, and the sulphide addition. One may visualize that the sulphide is primarily bonded to the cathode material depending on the much smaller solubility product for silver, nickel and cobalt sulphides compared to iron sulphide. The fact that there will nevertheless be no inactivation may then be explained in that the compounds thus formed do not interfere with the normal function of the air cathode or that these compounds take over part of the catalytical function of active oxide and hydroxides in non-treated cathodes. The improvement of the life of the cathode after treatment according to the invention may perhaps be explained by the sulphide additive simultaneously exerting a corrosion inhibiting action, perhaps by blocking corrosion reactions or by forming protection layers of sulphide.

When it comes to the important stabilizing action on the iron-air anode, one must simply conclude that the small quantity of sulphide which might be available for this purpose is apparently sufficient. One may then ask why very much larger quantities are necessary, for instance in the iron nickel battery as described in the Swedish Pat. No. 196,168. An explanation to this may be found in the very important differences between the iron nickel battery and the iron-air battery. The big difference is of course that the nickel electrode in the iron nickel battery contains several magnitudes more of active nickel material, than what is present in active air electrodes on a nickel base.

If the above theoretical explanations concerning the technical effect of the procedure according to the invention are correct, sulphide would thus successively be transferred from the iron electrode to the nickel electrode depending on the lower solubility of the nickel sulphide. This should, in the long run, deplete the iron electrode and make it necessary to supply the cell with an excess of sulphide from the beginning. One may also conceive other possibilities for the explanation of the unexpected technical effect of the small sulphide addition to iron air batteries compared to what is practiced at present with respect to sulphide addition. The fact, however, remains that the procedure according to the invention solves a very difficult problem within iron air technology in a surprisingly simple way.

A lower limit for the addition of sulphur-containing compound according to the invention cannot be determined as distinctly as the upper limit. The stabilizing effect may, however, be observed in many cases involving such small additions as 10 ppm. A range which is especially preferred is 100-500 ppm.

The addition can also be done successively in small portions, for instance on the order of 100 ppm until the stabilization which is the characteristic feature of the invention is produced. The total addition should however probably not exceed the level 1,000 ppm provided that a long time has not elapsed and that no electrolyte changes were carried out between the individual additions. It may also be necessary to repeat the addition after a long time of operation or abnormal operation conditions, for instance overcharge during a long time, since sulphur may then be lost from the system through oxidation at the air cathode, through the electrolyte changes or in other ways. Loss of sulphur in this way will manifest itself in a lesser stability of the battery with a reduced capacity outage. When this occurs, a new addition is made according to the invention. This addition can be carried out in several different ways. A particularly advantageous method when possible, is to carry out a very slow discharge of available capacity and then to make the sulphur addition to the electrolyte by mixing into the electrolyte a more concentrated solution of the sulphur containing compound successively while stirring to prevent high local concentrations. The iron-air battery is given a normal charge and is again ready for operation.

Another preferred method is to carry out the sulphur addition in connection with a discharge.

Many different sulphur containing compounds can be used for the procedure according to the invention. Examples of such compounds are inorganic sulphides with sufficient solubility in the electrolyte, preferably alkali metal sulphides like sodium sulphide and potassium sulphide.

One may, however, also use organic sulphur compounds which decompose in the electrolyte to inorganic sulphide. The German Offenlegungs publication No. 2,206,828, the content of which is hereby incorporated by reference, provides examples of such sulphur compounds for example thioacetic acid, thiobenzoic acid, 2-mercaptoethanol, thioformic acid, mercaptopropionic acid, thioglycolic acid, dithiobenzoic acid, dithoglycolic acid, mercapto butyric acid, etc. There are, however, no special advantages in using these special complicated sulphur-containing compounds since experience has shown that the simple sulphides like potassium sulphide and sodium sulphide give a sufficiently good result. Sulphur may also be added as hydrogen sulphide.

The invention will be described in the following in more detail by means of realistic examples.

EXAMPLE 1

An iron-air battery cell of the type having positive and negative electrodes and an alkaline electrolyte was tested before and after employing the principles of the present invention. The negative electrode contained electrochemically active iron, and the positive electrode contained silver and nickel. The electrodes were manufactured as described in the Swedish Pat. No. 360,952. This is a conventional battery of the type described in reprint No. 18, Power Resources Conference, Brighton, 1974. The cell was cycled for 14 cycles whereby a discharge curve according to FIG. 1 was obtained. The battery comprised 5 cells and FIG. 1 shows clearly that several of these cells were unstable. During discharge No. 15, $K_2S$ was added in a quantity corresponding to 150 ppm counted as weight of sulphur per weight of active iron. The discharge curve of the next cycle, which is shown in FIG. 2, illustrates clearly that the unstable cells have recovered and that this effect remains stable.

EXAMPLE 2

The experiment according to example 1 was repeated whereby $K_2S$ was added to the electrolyte before the first discharge. Again, in this case a much improved stability was obtained during cycling, i.e. a discharge curve mainly corresponding to the discharge curve shown in FIG. 2, compared to a case with straight potassium hydroxide solution with no additive (FIG. 1).

COMPARATIVE EXAMPLE

In the battery according to example 1, 1,200 ppm of sulphur in the form of potassium sulphide was added momentarily during discharge. Cell voltage was decreased during the next cycle and at the same time air cathodes exhibited increased leakage and small air bubbles previously observed were now ten times larger. The electrolyte became black and a precipitate was formed on the plastic components of the battery. The deterioration was found to be permanent during continued cycling.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a process for stabilizing an iron-air battery, which battery comprises one or more cells including a positive electrode which contains at least one of the metals cobalt, nickel, and silver for the reduction of oxygen during discharge and development of oxygen during charge, an alkaline electrolyte, and a negative electrode which contains electrochemically active iron, the process including the step of adding a sulphur-containing -containing compound to the electrolyte, the improvement comprising the step of adding sulphur-containing compound which forms free sulfide ions in said electrolyte, said compound being added in an amount sufficient to yield at least about 10 and up to about 1,000 parts per million by of sulphur in said compound per million parts by weight of active iron material.

2. The process of claim 1 wherein said sulphur-containing compound is added in a concentration within the range 100-500 ppm.

3. The process of claim 1 wherein said sulphur-containing compound is added progressively in portions, whereby the totally added amount thereof is no greater than about 1,000 ppm.

4. The process of claim 1 wherein said sulphur-containing compound comprises an alkali metal sulphide.

5. The process of claim 1 wherein said adding step is performed when the battery is exhibiting an unstable capacity.

6. The process of claim 1 wherein said adding step is performed during battery discharge.

7. The process of claim 1 wherein said adding step is performed after a very slow discharge of available capacity.

8. In an iron-air cell of the type comprising positive and negative electrodes and an alkaline electrolyte; said positive electrolyte containing at least one of the metals cobalt, nickel, and silver for the reduction of oxygen during discharge and development of oxygen during charge; said negative electrode containing electrochemically active iron; the improvement wherein said electrolyte contains a soluble sulphur-containing compound which forms free sulfide ions in said electrolyte, said compound being added in an amount sufficient to yield weight of sulphur in said compound per million parts by weight of active iron material.

9. The iron-air cell of claim 8 wherein said sulphur-containing compound is present in a concentration of at least about 100 ppm and up to about 500 ppm.

10. The iron-air cell of claim 8 wherein said sulphur containing compound comprises an alkali metal sulphide.

* * * * *